United States Patent [19]
Reynolds

[11] 4,027,802
[45] June 7, 1977

[54] BUILDING PANEL POSITIONER

[76] Inventor: Francis E. Reynolds, 166 E. 4th St., Chillicothe, Ohio 45601

[22] Filed: Aug. 3, 1976

[21] Appl. No.: 711,134

[52] U.S. Cl. .............................. 214/1 SW; 52/118; 52/127; 52/749

[51] Int. Cl.² .............................. B23Q 5/26

[58] Field of Search ............ 52/111, 749, 115, 118, 52/143; 248/354 H, 357; 254/11, 93 H, 93 L; 214/1 SW, 1 D, 1 H, 1 S

[56] References Cited

UNITED STATES PATENTS

| | | | |
|---|---|---|---|
| 1,606,101 | 11/1926 | Russell | 214/1 SW |
| 1,708,761 | 4/1929 | Horbath | 24/1 SW |
| 1,725,329 | 8/1929 | Blandford | 214/1 SW |
| 2,730,207 | 1/1956 | Hall | 52/115 |
| 2,828,870 | 4/1958 | Corley | 214/1 SW |
| 3,049,243 | 8/1962 | Buice | 214/1 SW |
| 3,382,988 | 5/1968 | O'Reilly | 214/1 SW |
| 3,643,935 | 2/1972 | Bell | 214/1 SW |
| 3,828,942 | 8/1974 | Young | 214/1 SW |
| 3,967,738 | 7/1976 | Winnings | 214/1 S |

FOREIGN PATENTS OR APPLICATIONS

| | | | |
|---|---|---|---|
| 1,149,856 | 1/1958 | France | 248/357 |

*Primary Examiner*—Leslie Braun

[57] ABSTRACT

The building panel positioner permits a building board or panel to be positioned adjacent a ceiling or wall framework in building construction. The device comprises a base from which a bottom, intermediate and top section vertically extend in telescoping interfitted adjustably extending relation to each other with support means having a planar surface for support of the board or panel. The support means has retaining means associated therewith to prevent lateral movement with respect thereto. In addition, the retaining means has locking means associated therewith to prevent outward movement of the board or panel relative to the planar surface.

2 Claims, 4 Drawing Figures

BUILDING PANEL POSITIONER

BACKGROUND OF THE INVENTION

This invention is directed to a portable device for lifting and positioning in place for nailing both ceiling as well as wall panel or board used in building construction.

The inventor has found it desirable that a portable device as herein described have the ability to retain the panel or board in relatively fixed position to the device when positioning the board or panel against the framework prior to nailing. This gives the user the ability that he can bring the board on the device into abutting positionment with the previously nailed board. In addition, by providing locking means with the device additional protection is provided to the user that an inadvertent engagement of the supported panel or board will cause it to fall of of the device and possibly injure the user of the device. The inventor has found it desirable that the device also be adaptable for use in applying panels or boards to walls and provision to facilitate this has been provided for in the invention.

SUMMARY OF THE INVENTION

A building panel positioner for use in applying ceiling or wall board or panel to a framework in building construction is disclosed and includes a base having wheels to facilitate positionment thereof, with an elongated hollow upright bottom section secured at one end thereof to the base. An elongated tubular intermediate section is mounted for telescopic movement inside the base section, with an elongated inner top section mounted for telescopic movement inside the intermediate section.

Support means is secured to the top section for containing thereon the board or panel during positionment relative to the framework. The support means includes a plurality of support arms extending outwardly from the top section to define a support plane. Retaining means for preventing lateral movement of the board or panel relative to the support means in a given direction is provided and may include a finger associated with at least one of the support arms at substantially one end thereof and adjustable to a position above the support plane, such that lateral movement of the board or panel on the support plane in the direction of the retaining means is prevented. Means for vertically adjusting the sections relative to each other for raising or lowering a wall board or panel positioned on the support means in place for securement to the framework is also provided.

OBJECTS OF THE INVENTION

An object of the present invention is to provide a portable device for lifting and positioning in place for nailing ceiling or wall panel used in building construction.

Another object of the present invention is to provide a lifting device that can be readily stored or transported from job to job, and which, as well as being readily movable from place to place while work progresss on the job.

Another object of the present invention is to provide a building panel lifter wherein the various telescopingly interfitted sections may be expanded and contracted to various heights by pneumatic means.

Another object of the present invention is to provide means associated with the building lifter device to retain the panel or board used in fixed relation thereto while positioning the panel or board in place.

Other objects and advantages of this invention will be apparent from the description hereinafter provided.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE DRAWINGS

Figure 1:
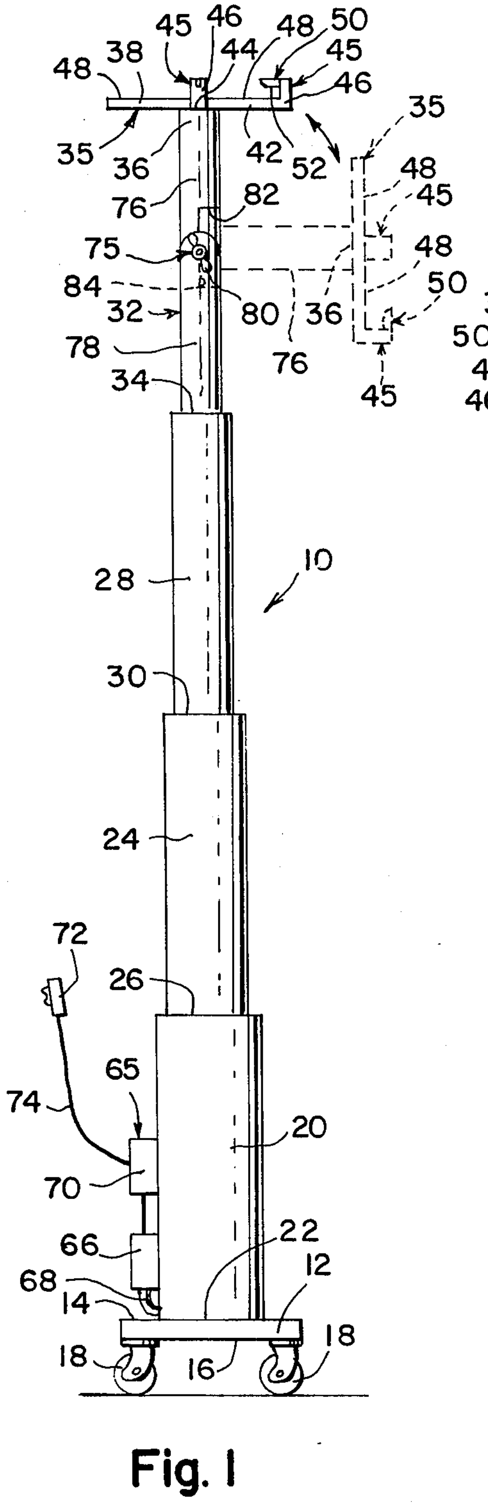
FIG. 1 is a side elevational view of a building panel positioner embodying the invention.
Figure 2:
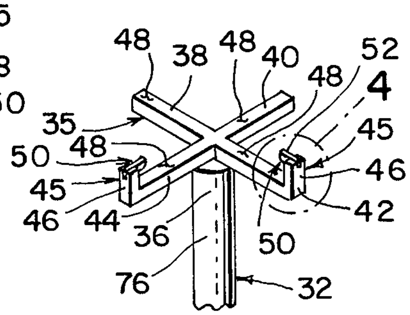
FIG. 2 is a fragmentary perspective view of the upper end of the building panel positioner.
Figure 3:
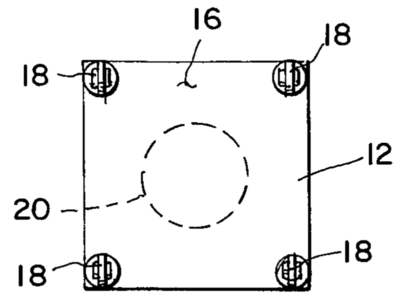
FIG. 3 is a bottom view of the building panel positioner.

The present invention as illustrated in FIGS. 1–4 discloses a building panel positioner 10 that is used in applying wall board or panel to a framework in building construction. The positioner 10 is adaptable to be used for both ceiling and wall applications. The positioner 10 includes a base 12 having an upper surface 14 and a lower surface 16 with a plurality of swivel casters or wheels 18 that support the base 12 and permit the user of the device to easily maneuver same to any desired position on the construction site.

An elongated hollow upright bottom section 20 is secured at its lower end 22 to the upper surface 14 of the base 12. An elongated tubular first intermediate section 24 is mounted for telescopic movement inside the base section 20 and extends outwardly beyond the upper end 26 of the base section 20. An elongated second intermediate section 28 is mounted for telescopic movement inside the first intermediate section 24 and extends beyond the upper end 30 of the first intermediate section 24. An elongated inner top section 32 is mounted for telescopic movement inside the second intermediate section 28 and extends beyond the upper end 34 thereof.

Support means 35 is secured to the upper end 36 of the top section 32 in a conventional manner. The support means 35 is adapted for containing thereon the board or panel during positionment relative to the framework. The support means 35 includes a plurality of support arms 38, 40, 42, and 44. These four support arms may be equally spaced and of substantially equal length.

It has been found desirable that when the panel positioner 10 is in use that the board or panel be retained in position so as to avoid a possible accident occuring by having the board or panel fall off of the positioner 10 and possibly injuring the user or some other individual. To prevent this from occuring, the retaining means 45 is provided in association with generally one or two of the support arms. The retaining means 45 is illustrated herein with respect to arms 42 and 44 which are adjacent to each other. The provision of the retaining means prevents lateral movement of the board or panel relative to the support means 35 during use of the positioner 10. The retaining means includes a finger or stop member 46 associated with the end of the support arm and extending to a position above the support plane defined by the upper surfaces 48 of the respective four arms.

Figure 4:
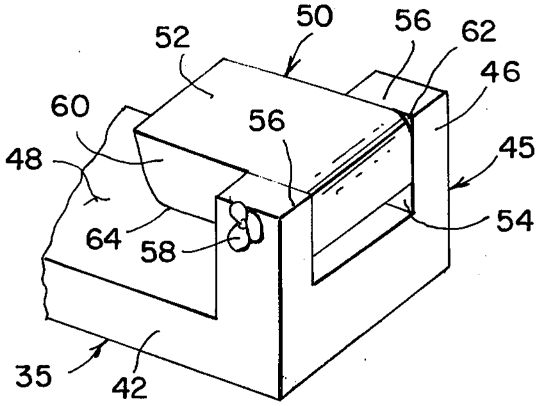
FIG. 4 is an enlarged fragmentary view of the locking means in accordance with the present invention.

Having positioned the board or panel on the support frame 48 and until the board or panel is nailed to the framework it has been found that the provision of locking means 50 further assures retention of the board or panel relative to the support means 35. As seen in FIG. 4, the support means may include a locking member 52 that is pivotably secured at one end thereof to its respective support arm. The support arm 42 has within the vertically extending stop member 46 a recess 54 defined by the upright sections 56. A transversely extending fastener 58 may have a lock nut or wing nut at one end thereof which, when tightened by the user, will retain the locking member in a substantially horizontal plane with the respective mating surfaces of the side walls 60 of the locking member 52 abutting the inner walls 62 of the upright members 56.

The contacting surface 64 of the locking member 52 in the horizontal position is spaced from the support planes 48 a distance sufficient to receive therein the board or panel. The degree to which the fastener 58 is tightened can be of sufficient force such that upon securement of the board or panel to the framework the lowering of the respective telescopic sections is such that the locking member 52 is automatically released into its vertical position to thereby permit the lowering of the panel positioner 10.

To obtain the raising or lowering of the wall board or panel vertically adjusting means 65 is provided and may include a compressor 66 that is connected by cable 68 to the lower section 20 which may have contained therein either a hydraulic fluid or be of the design where compressed air is the moving force for raising or lowering the respective sections 20, 24, 28, and 34 relative to each other. In operative relation to the compressor 66 is an electric motor 70 that can be powered by conventional current and having an on and off switch 72 electrically connected by cable 74 to the electric motor 70 such that when the motor 70 is energized the compressor 66 is actuated to raise and lower the sections with respect to each other.

In operation, the device 10 would first be lowered to a point such that the board or panel may be placed upon the planar support surface 48 defined by the respective arms 38, 40, 42, and 44. The wall board or panel would be positioned to abut the retaining means 45 along two edges of the board or panel. The user would then engage the locking means 50 such that the locking member 52 overlaps the wall board or panel.

The vertically adjusting means 65 is then actuated to raise the wall board or panel to its desired position adjacent the framework whereupon it is nailed to the framework. The locking means as described above being disengageable with a certain degree of force will automatically open when the user retracts the section downwardly thereby leaving the wall board nailed to the framework.

The present invention also provides the user with the ability to support vertically extending boards or panels which are to be secured to a wall. Towards this end, angularly adjusting means 75 is associated with the upper section 32 and as seen the upper section 32 is comprised of an upper member 76 and a lower member 78 that are pivotally secured together by a transversely extending fastener 80. The upper member is provided wih an indentation forming an abutting surface 82 and lower section is formed with a complementary recess forming an abutting surface 84. In this manner when the fastener 80 is loosened, the upper member 76 may be rotated approximately 90° such that the planar surface 48 extends vertically and the locking means 50 may be utilized as discussed above.

The construction of the various components may be made out of metal or heavy duty plastic or any combination thereof in order to obtain the desired prolonged use of the device. When the structure of the building panel positioner 10 is no longer needed for use it can be rolled to a position which is out of the way. When it is desired it can be rolled back to beneath the work site for use.

Although an illustrative embodiment of the invention has been described in detail herein with reference to the accompanying drawings it is to be understood that the invention is not limited to the precise embodiment, and that various changes and modifications may be effected therein without departing from the scope or spirit of the invention.

I claim:

1. A building panel positioner for use in applying ceiling or wall board or panel to a framework in building construction comprising:

a. a base having wheels to facilitate positionment thereof;

b. an elongated hollow upright bottom section secured at one end thereof to said base;

c. an elongated tubular intermediate section mounted for telescopic movement inside said base section;

d. an elongated inner top section mounted for telescopic movement inside said intermediate section;

e. support means secured to said top section for containing thereon the board or panel during positionment relative to the framework, said support means including four substantially equally spaced support arms extending outwardly from said top section to define a planar support surface;

f. retaining means for preventing lateral movement of the board or panel relative to said support means in a given direction, said retaining means including a vertically extending finger associated with at least two of said adjacent support arms at substantially one end thereof positioned above the support plane, such that lateral movement of the board or panel on the support plane in the direction of said retaining means is prevented;

g. means for vertically adjusting said sections relative to each other for raising or lowering a wall board or panel positioned on said support means in place for securment to the framework;

h. said vertically adjusting means includes a compressor, an electric motor for powering said compressor, and a switch electrically connected to said electric motor, such that when said motor is energized the compressor is actuated to raise and lower said sections;

i. locking means in operative relation with said retaining means on two of said adjacent support arms to be adjusted to a position in spaced relation to said support arm and in partially overlapping relation to the board or panel, such that outward movement of the board or panel from the support plane is prevented; and j. said locking means includes:
   i. a locking member pivotally secured at one end to the upper end of said finger,
   ii. means for securing said locking member in releasably fixed position and in overlapping relation to the board or panel,
   iii. mating surfaces on said locking member and said finger for engagement with each other, and
   iv. said securing means includes a fastener extending between said locking member and said finger which when tightened will retain said mating surfaces in fixed position.

2. A building panel positioner as defined in claim 1, and further including means for angularly adjusting said top section so as to obtain the planar surface to extend in a substantially vertical plane such that the board or panel may be supported thereon for positionment against the framework such as on a wall, wherein said angularly adjusting means includes:

a. a lower member forming one portion of said top section;

b. an upper member forming the other portion of said top section with said support means coupled thereto and swingable downwardly with respect to said lower member; and c. means for interjoining said members in adjusted positions; and said securing means being adjustably tightenable to retain said locking member relative to said finger such that said locking member is automatically releasable into its vertical position after the board or panel is secured to the framework upon the lowering of the panel positioner.

* * * * *